United States Patent [19]

Shaw et al.

[11] 4,410,448
[45] Oct. 18, 1983

[54] METHOD FOR CONTROLLING THE CHANGE IN THE CRUSH STRENGTH OF A CATALYST PARTICLE DURING FINISHING CALCINATION

[75] Inventors: Wilfrid G. Shaw, Lyndhurst; David R. Woodbury, Bedford Hts., both of Ohio

[73] Assignee: The Standard Oil Company, Cleveland, Ohio

[21] Appl. No.: 335,313

[22] Filed: Dec. 28, 1981

[51] Int. Cl.$^3$ .................... B01J 21/00; B01J 31/02; B01J 21/02; B01J 27/14

[52] U.S. Cl. .................... 502/159; 502/170; 502/174; 502/202; 502/208; 502/503

[58] Field of Search .............. 252/410, 430, 432, 435, 252/437

[56] References Cited

U.S. PATENT DOCUMENTS

| | | | |
|---|---|---|---|
| 2,618,615 | 11/1952 | Connolly | 252/449 |
| 2,933,543 | 4/1960 | Ambridge et al. | 260/680 |
| 3,248,340 | 4/1966 | Callahan et al. | 252/432 |
| 3,354,096 | 11/1967 | Young | 252/435 |
| 3,642,930 | 2/1972 | Grosselli et al. | 252/437 |
| 4,017,423 | 4/1977 | White et al. | 252/437 |
| 4,042,533 | 8/1977 | Shaw et al. | 252/437 |
| 4,062,802 | 12/1977 | Bertolocini et al. | 252/437 X |
| 4,110,369 | 8/1978 | White et al. | 252/435 X |
| 4,113,660 | 9/1978 | Abe et al. | 252/455 R |
| 4,139,497 | 2/1979 | Castor et al. | 252/470 |
| 4,253,988 | 3/1981 | Mount et al. | 252/435 |
| 4,260,520 | 4/1981 | Erpenbach et al. | 252/435 X |
| 4,299,730 | 11/1981 | Sommer et al. | 252/435 |
| 4,301,030 | 11/1981 | Shaw et al. | 252/437 X |
| 4,301,031 | 11/1981 | Shaw et al. | 252/437 X |
| 4,329,257 | 5/1982 | Sommer et al. | 252/435 |
| 4,334,118 | 6/1982 | Manning | 252/435 X |

*Primary Examiner*—William G. Wright
*Attorney, Agent, or Firm*—Gary R. Plotecher; Herbert D. Knudsen; Larry W. Evans

[57] ABSTRACT

The change in the crush strength of a catalyst particle as it is transformed from a catalyst precursor to a finished catalyst by calcination is controlled by the method comprising:

1. Preparing a catalyst precursor containing at least one metal element,
2. Adjusting the volatile portion of the catalyst precursor to a predetermined level,
3. Adjusting the water content of the volatile-adjusted precursor of (2) to a predetermined level,
4. Forming the catalyst particle from the water-adjusted precursor of (3), and
5. Transforming the catalyst precursor particle of (4) into a finished catalyst particle by calcination.

18 Claims, No Drawings

METHOD FOR CONTROLLING THE CHANGE IN THE CRUSH STRENGTH OF A CATALYST PARTICLE DURING FINISHING CALCINATION

BACKGROUND OF THE INVENTION

1. Field of the Invention

This invention relates to the manufacture of catalyst particles. In one aspect, the invention relates to the manufacture of finished catalyst particles having a relatively low crush strength, e.g. less than 10 pounds, while in another aspect, the invention relates to the control of the change in the crush strength of the catalyst particles as the catalyst precursor is transformed into a finished catalyst by calcination.

2. Description of the Prior Art

Often times the activity of a catalyst particle, typically a tablet, is related to its crush strength, i.e. its resistance to breakage when subjected to some force. Generally, the higher the crush strength of a catalyst particle, the more tightly packed or dense the particle and thus the less porous the particle. Again, generally, the less porous the catalyst particle, the less active the catalyst particle. However, generally the more porous the catalyst particle, the more likely the catalyst particle will be eroded under reaction conditions and thus the more likely catalyst mass will be lost over time. Likewise, the lower the crush strength of a catalyst particle, the more likely it will break during handling or loading of a reactor. This can be a particularly acute problem in continuous processes where catalyst errosion can result in the formation of catalyst fines that are carried from the reaction zone with the reaction effluent or in an increased back pressure in the reactor. As a consequence, catalyst particles are desirably manufactured with a crush strength that maximizes porosity but minimizes attrition. Unfortunately, this desirable manufacture is difficult to achieve on a consistent basis.

The crush strength of a catalyst precursor particle can generally be readily controlled by simply programming or adjusting the settings of the apparatus, e.g. a tabletting machine, used to shape the particle. However, one particular problem in achieving the desired manufacture mentioned above is that the crush strength of the catalyst particle undergoes change during the calcination step that is generally used to transform a catalyst precursor into a finished catalyst. This change has been subject to little control, e.g. the crush strength of finished catalyst particles may vary in the low crush range from batch to batch relatively independent of the apparatus setting used to form the catalyst precursor particles. As such, it is difficult, if not impossible, to consistently manufacture low crush strength, finished catalyst particles having approximately the same low crush strength.

SUMMARY OF THE INVENTION

According to this invention, the change in the crush strength of a catalyst particle as it is transformed from a catalyst precursor to a finished catalyst by calcination is controlled by a method comprising:

1. Preparing a catalyst precursor of at least one metal component,
2. Adjusting the volatile portion of the catalyst precursor to a predetermined level,
3. Adjusting the water content of the volatile-adjusted precursor of (2) to a predetermined level,
4. Forming the catalyst particle from the water-adjusted precursor of (3), and
5. Transforming the catalyst precursor particle of (4) into a finished catalyst particle by calcination.

The hallmarks of this method are the adjustment of the volatile and water content of the catalyst precursor which facilitates the control of the crush strength of the finished catalyst particle. Finished catalyst particles manufactured by this process not only demonstrate good activity and retain their physical integrity, but they can also be consistently manufactured within a desired crush strength range.

DETAILED DESCRIPTION OF THE INVENTION

Catalyst Composition

This invention can be used to manufacture finished catalyst particles of widely different composition. The catalyst particles are metal oxides, typically mixed metal oxides, that can contain nonmetal components. This invention is particularly useful for preparing finished particles of promoted phosphomolybdic oxide catalysts containing at least one metal element selected from Group IA, IIA, IIIB, VB, VIB, VIIB, VIII, IB, IIB, VA, VIA and the rare earth elements of the Periodic Table as published by E. H. Sargent & Co. (1964), especially finished catalyst particles having the composition of the empirical formula

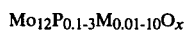

$$Mo_{12}P_{0.1-3}M_{0.01-10}O_x \qquad (I)$$

where

M is at least one of potassium, rubidium, cesium, barium, zinc, cadmium, titanium, calcium, magnesium, manganese, tantalum, zirconium, cerium, nickel, cobalt, chromium, iron, thallium, bismuth, copper, vanadium, niobium, a rare earth element, arsenic, and antimony; and x is a number that satisfies the valence requirements of the other elements present. Usually M is a combination of at least two and preferably at least three metal components and finished catalyst particles where M includes an alkali metal, at least one of iron, cobalt and nickel, and bismuth are well suited for preparation by this invention. The method of this invention is also particularly useful for preparing finished catalyst particles having the compositions of those catalysts described in U.S. Pat. Nos. 3,642,930; 4,017,423; 4,042,533; 4,301,030 and 4,301,031. The disclosures of these patents are here incorporated by reference.

The compositions of the catalyst particles prepared by the method of this invention can be either in the 100% active form or in a diluted form and they can be either unsupported or supported. If a support is a desired component of a catalyst particles, any suitable support can be used in the practice of this invention and includes such diverse materials, as silica, alumina, titania, zirconia, silicon carbide, boron, carbon, various phosphates, etc. The amount of support used and the method in which it is incorporated into the final catalyst composition can be varied to convenience and catalyst purpose.

Method Procedure

The first step of this invention is the preparation of a catalyst precursor. This material is a combination of the various catalyst components, with or without a support and/or a diluent. The precursor can be prepared in any one of a number of different methods, a typical method of preparation being the mixing of the appropriate catalyst components in the proper proportions in an aqueous mixture and drying the resulting aqueous mixture, solution or slurry, with or without a reducing agent. Optionally, the aqueous solution or slurry can be pH adjusted to some predetermined level and then aged prior to drying. The catalyst components can be added in any order but certain orders are preferred. When preparing the catalyst precursor for a promoted phosphomolybdic oxide catalyst, the metal volatiles are typically formulated into an aqueous solution or slurry, combined with phosphoric acid followed by an ammonical solution of molybdenum and then pH adjusted to the acid range, e.g. 3-5. Other methods of preparing the catalyst precursor can be used including those where an organic or organic-water media is substituted for the aqueous media.

By the term "volatile" is meant a substance of the catalyst precursor that will vaporize, decompose and/or oxidize and thus be removed from the catalyst precursor when subjected to sufficient heat for sufficient time. Representative volatiles include nitrates, halides, carbonates, acetates, corn starch, a polymer, a cellulosic material, a powdered grain such as oats, wheat, etc., and wood flour. Typically these substances are introduced into the catalyst precursor as either the counter ion to one or more of the metal components in the catalyst, e.g. potassium nitrate, copper acetate, etc. or as a diluent or extender, e.g. corn starch. If an extender is used, then it is usually introduced into the catalyst composition by blending it with the precursor powder prior to the water content adjustment but subsequent to the volatile content adjustment. The various nitrates ($NO_x$) are the preferred volatiles.

Once the catalyst precursor has been formed, its volatile content is adjusted to some predetermined level. This level is established by noting the volatile content of those catalyst precursors that gave finished catalyst particles of the desired crush strength. The proper volatile content for a catalyst precursor will depend upon its composition and thus must be independently determined for each individual catalyst. However, although the determination is established through a trial and error procedure, it is not complicated and can generally be accurately determined within five or six runs. Typically, the volatile portion of the catalyst precursor is reduced to about 6-25 weight percent, preferably 8-20 weight percent, of the total weight of the precursor prior to being shaped or formed into discrete particles.

One method for adjusting the volatile content of a catalyst precursor is to first divide the precursor into a first batch and a second batch. The first batch is then subjected to sufficient heat for a sufficient period of time to remove a substantial amount (greater than about 50 weight percent) of the initial volatile content of that particular batch. Of course, the devolatilizing temperature and time of this particular method will vary with, among other factors, the nature of the volatile but where the volatile is a nitrate, a temperature range of 150° C. to 300° C. and a time range of 0.1 to 24 hrs is typical. The first batch thus becomes a devolatilized catalyst precursor. A part of the devolatilized catalyst precursor is then mixed, in the proper proportion, with a part of the second batch to form a precursor mixture of some measured volatile content. The second batch can, if desired, also undergo some devolatilization treatment but this is generally not necessary for good results.

The water content of the precursor mixture is then adjusted to some predetermined level. Here too, this level is established by trial and error and is ultimately determined by knowing the water content of the precursor mixture of a finished catalyst particle having the desired crush strength. Any appropriate method can be used for adjusting the water content from simply drying the mixture if the water content is too high to adding water to the precursor mixture if the water content is too low. In the case of the latter, the water is typically added as a vapor or fine mist. The water content of the precursor mixture is generally adjusted to about 0.5-8 weight percent, preferably to about 1-4 weight percent, of the total weight of the mixture. Catalyst precursors of formula I having an adjusted volatile content between about 6-20 weight percent and an adjusted water content between about 1-4 weight percent are particularly useful in forming finished catalyst particles, usually tablets, having a crush strength between about 3 and 10 pounds.

Although the volatile content of the precursor is usually adjusted before its water content, the order can be reversed if desired.

After both the water and volatile content of the catalyst precursor mixture have been adjusted, the catalyst can be formed into some particle. Typically the catalyst precursor is shaped into tablets but it can also be shaped into spheres, saddles, extrudates, etc. If desired, prior to shaping the catalyst particle a lubricant, such as graphite, can be admixed with the precursor mixture as an aid in the shaping process.

Once the catalyst particle is formed, it is finished or activated by calcination. The conditions of this step will vary with the catalyst composition and its intended use, but generally they involve exposing the formed catalyst precursor to oxygen at an elevated temperature (usually greater than the temperature at which the finished catalyst particle will be used) for some predetermined period of time. Calcination can either precede use of the catalyst or be done in situ.

The method of this invention is more fully described by the following examples. Unless indicated to the contrary, all parts and percentages are by weight.

SPECIFIC EMBODIMENTS

The catalysts of the following examples were prepared by dissolving and/or dispersing in distilled water, with heating-stirring, a nitrate salt of the various metals (except molybdenum), phosphoric acid, an ammonical solution of molybdenum, and a silica support and the resulting slurry was heated to 140° F. The pH of the slurry was then adjusted to 3-4, cooled, and the slurry was allowed to age with continuous stirring for approximately 16 hours. After the aging, the pH was checked, and, if necessary, again adjusted to 3-4 and then subjected to spray drying to form a catalyst precursor.

The precursor was divided into two batches and the first batch was substantially denitrified by subjecting it to heat in a pot furnace. After denitrification, a precursor mixture of a predetermined nitrate (volatile) level was prepared by blending appropriate amounts of the devolatilized (nitrate-lean) batch with the second (nitrate-rich) batch.

The portion of the powdered precursor mixture that passed through a 50 mesh US standard screen was then exposed to water vapor in a humidity chamber to adjust its water content to a predetermined level. In Examples 28 and 29, the corn starch was blended with the catalyst precursor powder prior to the water content adjustment but subsequent to the volatile content adjustment. The water adjusted precursor mixture was then blended with graphite, a lubricant, and formed into tablets measuring approximately 5 mm in height and 2 mm in diameter. The catalyst precursor particles were finally calcined for at least four hours at a temperature in excess of 560° C.

Crush strength measurements were made between 15 minutes and 4 hours after tableting in the case of green or catalyst precursor particles and within 15 minutes and 4 hours after calcination for the finished catalyst particles. The crush numbers were determined by averaging the individual crush strengths of 50–100 tablets per Example. The crush strength was the pounds pressure it took to crush a tablet, placed on edge, between two flat surfaces.

The change in crush strength from precursor to finished catalyst tablets per the change in volatile and/or water content is reported in the following Table. The catalyst used in each Example contained the following elements at the same atomic ratio: K, Fe, Co, Ni, Bi, P, Mo and O admixed with a silica support. The crush strengths of the precursor tablets were both set and varied by adjusting the pressure control of the tabletting machine accordingly.

TABLE 1

The Effect of the $NO_x$ and $H_2O$ Levels on the Change in Crush Strength of a Catalyst Tablet as it is Transformed by Calcination From a Catalyst Precursor to a Finished Catalyst

| Example No. | % $NO_x$ | % $H_2O$ | Crush Strength, lbs Precursor | Finished |
|---|---|---|---|---|
| 1 | 10.5 | 0.2 | 8.0 | 4.6 |
| 2 | 10.5 | 1.5 | 7.7 | 6.1 |
| 3 | 10.5 | 3.5 | 7.7 | 8.0 |
| 4 | 12.3 | 0.2 | 8.7 | 4.5 |
| 5 | 12.3 | 0.2 | 8.1 | 4.4 |
| 6 | 12.3 | 1.5 | 7.1 | 4.9 |
| 7 | 12.3 | 1.5 | 8.2 | 5.8 |
| 8 | 12.3 | 3.5 | 7.9 | 8.0 |
| 9 | 12.9 | 0.1 | 8.8 | 4.1 |
| 10 | 17.4 | 0.1 | 8.7 | 3.1 |
| 11 | 14.3 | 3.1 | 5.7 | 2.9 |
| 12 | 14.3 | 3.1 | 5.6 | 3.5 |
| 13 | 14.3 | 3.1 | 6.6 | 3.8 |
| 14 | 14.3 | 3.1 | 8.9 | 5.7 |
| 15 | 14.3 | 3.1 | 9.9 | 6.4 |
| 16 | 18.7 | 3.9 | 5.0 | 1.4 |
| 17 | 18.7 | 3.9 | 6.0 | 1.6 |
| 18 | 18.7 | 3.9 | 7.8 | 2.9 |
| 19 | 18.7 | 3.9 | 10.0 | 4.2 |
| 20 | 18.7 | 3.9 | 11.2 | 4.7 |
| 21 | 18.7 | 5.2 | 4.4 | 2.1 |
| 22 | 18.7 | 5.2 | 5.3 | 2.5 |
| 23 | 18.7 | 5.2 | 6.7 | 3.7 |
| 24 | 18.7 | 5.2 | 7.9 | 3.9 |
| 25 | 18.7 | 5.2 | 8.7 | 5.2 |
| 26 | 18.7 | 5.2 | 10.6 | 6.0 |

TABLE 2

Use of Corn Starch as a Partial Replacement for Nitrate in Tabletted Catalyst

| Example No. | % $NO_x$ | % Corn Starch | % $H_2O$ | Crush Strength, lbs Precursor | Finished |
|---|---|---|---|---|---|
| 27 | 13.2 | 0 | 3.5 | 6.0 | 4.9 |
| 28 | 12.4 | 1.0 | 3.6 | 6.5 | 5.1 |
| 29 | 10.5 | 3.0 | 3.4 | 6.6 | 5.0 |

The data of Examples 1–3 shows that generally, the greater the water content of the catalyst precursor, the less the change in tablet crush strength from precursor to finished catalyst. The data of Examples 4–8 confirm this at high nitrate levels. The water content of the catalyst precursor in Examples 9–10 is very low, almost "dry", and at this condition, the greater the nitrate level of the catalyst precursor, generally the greater the change (here drop) in the tablet crush strength due to calcination. The data of Examples 11–15, 16–20 and 21–26 demonstrate that the control of the change in tablet crush strength due to finishing calacination is relatively independent of the tablet machine setting used to shape the catalyst precursor powder into a tablet form. Even at different nitrate and water levels, the change in tablet crush strength continues the same trend, and is consistent regardless of the machine settings. The change in precursor to finished crush is still a function of the amount of $NO_x$ and $H_2O$ present.

The data of Table II show that use of volatiles other than nitrates can be used in the control of the change in tablet crush strength due to finishing calcination.

Although the invention has been described in considerable detail through the preceding examples, these examples are for the purpose of illustration only and it is understood that variations and modifications can be made by one skilled in the art without departing from the spirit and scope of the appended claims.

What is claimed is:

1. A method of controlling the change in the crush strength of a catalyst particle as the catalyst particle is transformed from a catalyst precursor to a finished catalyst by calcination, the method comprising:
   1. Preparing a catalyst precusor containing at least one metal component,
   2. Adjusting the volatile portion of the catalyst precursor to a predetermined level of 6–25 weight per-cent,
   3. Adjusting the water content of the volatile-adjusted precursor of (2) to a predetermined level of 0.5–0.8 weight per-cent,
   4. Forming a catalyst particle from the water-adjusted precursor of (3), and
   5. Transforming the catalyst precursor particle of (4) into a finished catalyst particle by calcination.

2. The method of claim 1 wherein the volatile portion of the catatalyst precusor is adjusted by:
   A. Dividing the precursor into a first batch and a second batch,
   B. Substantially reducing the volatile portion of the first batch to form a devolatilized precursor, and
   C. Mixing at least a part of the devolatilized precursor with at least a part of the second batch to form a precursor mixture having a predetermined volatile content.

3. The method of claim 2 wherein the volatile portion of the first batch is substantially reduced by subjecting the batch to a temperature and for a time sufficient to remove by at least one of vaporization and decomposition the majority of the volatile portion of the catalyst precursor.

4. The method of claim 3 where the temperature is at least about 150° C. and the time is at least about 6 minutes.

5. The method of claim 4 where the volatile portion of the catalyst precursor is reduced to about 6–20 wt % of the total weight of the precursor.

6. The method of claim 4 where the volatile portion of the catalyst precursor is reduced to about 10–15 wt % of the total weight of the precursor.

7. The method of claim 5 where the water content of the precursor mixture is adjusted by exposing the mixture to a predetermined amount of water vapor or water mist.

8. The method of claim 7 where the water content of the precursor mixture is adjusted to about 1–4 wt % of the total weight of the mixture.

9. The method of claim 7 where the volatile portion of the catalyst precursor is at least one of a nitrate, halide, a carbonate, an acetate, corn starch, a polymer, a cellulosic material, a powdered grain and wood flour.

10. The method of claim 9 where the catalyst precursor composition contains phosphorus.

11. The method of claim 10 where the catalyst precursor composition contains at least two metal elements selected from Groups IA, IIA, IIIB, VB, VIB, VIIB, VIII, IB and VA.

12. The method of claim 11 where the catalyst precursor composition contains at least one of molybdenum, an alkali metal, a Group VIII metal and bismuth.

13. The method of claim 12 where the catalyst precursor composition contains a support.

14. The method of claim 13 where the support is selected from the group consisting of alumina and silica.

15. The method of claim 14 where the precursor mixture is blended with a lubricant prior to forming the catalyst particle.

16. The method of claim 15 where the lubricant is graphite.

17. The method of claim 16 where the precursor mixture is formed into the shape of a tablet.

18. A method of controlling the change in the crush strength of a catalyst particle as the catalyst particle is transformed from a catalyst precursor to a finished catalyst by calcination, the method comprising:
 1. Preparing a catalyst precursor containing at least one metal component,
 2. Adjusting both the volatile and water content of the catalyst precursor to predetermined levels of 6–25 weight per-cent and 0.5–8.0 weight per-cent respectively
 3. Forming a catalyst particle from the precursor of (2), and
 4. Transforming the catalyst precursor particle of (3) into a finished catalyst particle by calcination.

* * * * *